United States Patent [19]
Kapany et al.

[11] 3,988,057
[45] Oct. 26, 1976

[54] PRISM REFLECTOR FOR OPTICAL PROJECTOR/READER

[75] Inventors: Narinder S. Kapany, Woodside; Fred C. Unterleitner, Palo Alto, both of Calif.

[73] Assignee: Kaptron, Inc., Palo Alto, Calif.

[22] Filed: Aug. 13, 1975

[21] Appl. No.: 604,186

Related U.S. Application Data

[62] Division of Ser. No. 518,254, Oct. 29, 1974, Pat. No. 3,941,467.

[52] U.S. Cl. .................................. 350/286; 350/299
[51] Int. Cl.$^2$ ........................ G02B 5/04; G02B 5/08
[58] Field of Search ........... 350/286, 287, 299, 301; 350/291, 48, 49, 50, 173; 353/81, 98, 78, 27; 354/150, 151, 155, 219, 220, 224; 355/4 S

[56] References Cited
UNITED STATES PATENTS

| | | | |
|---|---|---|---|
| 2,472,600 | 6/1949 | Luboshez | 350/286 |
| 3,720,463 | 3/1973 | Taylor | 353/78 |

FOREIGN PATENTS OR APPLICATIONS

| | | | |
|---|---|---|---|
| 867,310 | 12/1952 | Germany | 350/286 |
| 11,556 | 5/1900 | United Kingdom | 350/286 |
| 622,107 | 4/1949 | United Kingdom | 350/286 |

*Primary Examiner*—Ronald J. Stern
*Assistant Examiner*—Jon W. Henry
*Attorney, Agent, or Firm*—Limbach, Limbach & Sutton

[57] ABSTRACT

Light from a bulb is projected through the microfiche transparency by a condensor and a projection lens system and the projected image therefrom is passed through a prism to viewing screen means. The prism has a flat or curved, transparent entrant surface for receiving the projected image, a flat, transparent exit surface facing the viewing screen means, a first, metal coated reflecting surface opposite to the entrant surface and forming a predetermined acute angle with the exit surface such that a major portion of the light beam passing through the entrant surface is reflected by the first reflecting surface to the exit surface at at incident angle greater than the critical angle for total internal reflection by the exit surface and a second, metal coated reflecting surface angularly facing the exit surface for returning the light beam reflected internally by the exit surface back to the exit surface at an incident angle which is less than the critical angle such that the returned light beam passes through the exit surface to impinge on the viewing screen means.

In one preferred embodiment the prism further includes a third, metal coated reflecting surface which is co-planar with the exit surface for receiving a minor portion of the light beam reflected by the first reflecting surface and for reflecting it to tne second reflecting surface.

4 Claims, No Drawings

PRISM REFLECTOR FOR OPTICAL PROJECTOR/READER

This is a division of application Ser. No. 518,254, filed Oct. 29, 1974 now U.S. Pat. No. 3,941,467.

BACKGROUND OF THE INVENTION

The invention relates to apparatus for viewing or recording transparencies such as microfilm, microfiche, still and motion pictures as well as images produced by a television or microscope.

In most microfiche systems the photographed image is reduced in size 24 times or more. In order to be viewed it should be magnified at least half that number to be intelligible to the viewer. One problem in making viewers for such microfiche transparencies which are portable is in "folding" the long optical path necessary to develop this magnification factor of 12 or more. Many prior art devices have used mirrors, lenses and dovetail prism systems in order to accomplish this result. Such devices suffer from a number of disadvantages such as being delicate, expensive, bulky and difficult to operate.

SUMMARY OF THE INVENTION

The above and other disadvantages are overcome by the present invention of apparatus for viewing a transparency comprising means for projecting a diverging light beam through the transparency, viewing screen means for displaying light projected through the transparency onto the viewing screen means. The prism means include a prism having a flat or curved, transparent entrant surface for receiving the light beam, a flat, transparent exit surface facing the viewing screen means, a first, metal coated reflecting surface opposite to the entrant surface and forming a predetermined acute angle with the exit surface such that a major portion of the light beam passing through the entrant surface is reflected by the first reflecting surface to the exit surface at an incident angle greater than the critical angle for total internal reflection by the exit surface, and a second, metal coated reflecting surface angularly facing the exit surface for returning the light beam reflected internally by the exit surface to impinge on the viewing screen means. In one preferred embodiment the prism further includes a third, metal coated reflecting surface which is co-planar with the exit surface for receiving a minor portion of the light beam reflected by the first reflecting surface and for reflecting it to the second reflecting surface.

In one preferred embodiment the prism has the cross-sectional shape of a trapezium and is made of polymethylmethacrylate. The viewing screen means comprise an outer, light diffusing member or screen and a Fresnel lens positioned between the light diffusing member and the exit surface. The purpose of the Fresnel lens and the diffusing screen is to give an image which is substantially uniform in illumination across the area of the screen. Such light diffusing panels and Fresnel lenses for accomplishing this purpose are well known in the art.

The light beam projecting means include a low power consuming light bulb, which may be powered by a battery, which shines a light beam through two condenser lenses at right angles to each other with a 45° reflecting mirror between them and then through the microfiche transparency.

The projected image from the transparency passes through a projection lens assembly into a small, three-sided reflecting prism which mates with the entrant surface of the major prism. The major portion of the light beam passing through the transparency is reflected by the smaller prism to the first reflecting surface which reflects portions of the light beam up to both the third reflecting surface and to the exit surface. The incident angle of the light beam portion reaching the exit surface, as stated above, is greater than the critical angle and is totally internally reflected to the second reflecting surface. The light striking the third reflecting surface from the first reflecting surface is typically incident at an angle smaller than the critical angle but is also reflected to the second reflecting surface by the metal coating. All the light reaching the second reflecting surface is then reflected back to, and out of the exit surface.

The light beam projecting means, the viewing screen means and the prism means are all contained in a lightweight, plastic housing which is provided with a slot in its side to receive the transparency, such as still or movie film, which is to be projected.

By reason of the fact that the projected light beam is reflected at least three times by the major prism, greater optical path lengths are obtained than in many prior art viewing devices. Furthermore, this path length is achieved without the use of delicately aligned mirrors as has been done in the prior art. The simplicity of the present invention makes it both economical to manufacture and extremely durable. Because of the cross-sectional shape of the prism, it is also compact in size in both length and thickness.

A further advantage of the invention is that the light projected through the transparency is conserved by virtue of the prism-optics of the invention so that a low power consuming, battery operated light bulb may be used while maintaining a relatively high intensity in the viewed image.

The optical projector/reader of the invention is also suitable for viewing transparencies other than photographic film and can be used for enlarging and projecting the viewing image obtained from a microscope, for example. In such an embodiment the slide specimen constitutes the transparency which is enlarged and projected. In still other embodiments additional devices are coupled to the viewing screen or exit surface of the primary prism. Such additional devices can include a camera, especially a camera utilizing self-developing film, or a xerographic photocopier. Other suitable attachments would include a secondary magnifier.

Furthermore the apparatus of the invention can be used in the reverse of the above described operation, that is, the full size image of a transparency can be projected into the "viewing" screen and a reduced image obtained at the entrant surface of the primary prism. This reduced image can then be stored or transmitted by a suitable medium such as photographic film or a fiber optic bundle, respectively, for example.

It is therefore an object of the present invention to provide a compact apparatus for viewing a transparency, such as a microfiche transparency;

It is also an object of the invention to provide a transparency viewer which is economical in cost;

It is another object of the invention to provide a transparency viewer which is durable and not subject to misalignment;

It is still another object of the invention to preserve most of the transmitted viewing light so that low power consuming, battery operable projection lamps can be used; and It is a still further object of the invention to provide a transparency viewer which is simple to assemble.

The foregoing and other objectives, features and advantages of the invention will be more readily understood upon consideration of the following detailed description of certain preferred embodiments of the invention, taken in conjunction with the accompanying drawings.

DETAILED DESCRIPTION OF CERTAIN PREFERRED EMBODIMENTS

Figure 1:
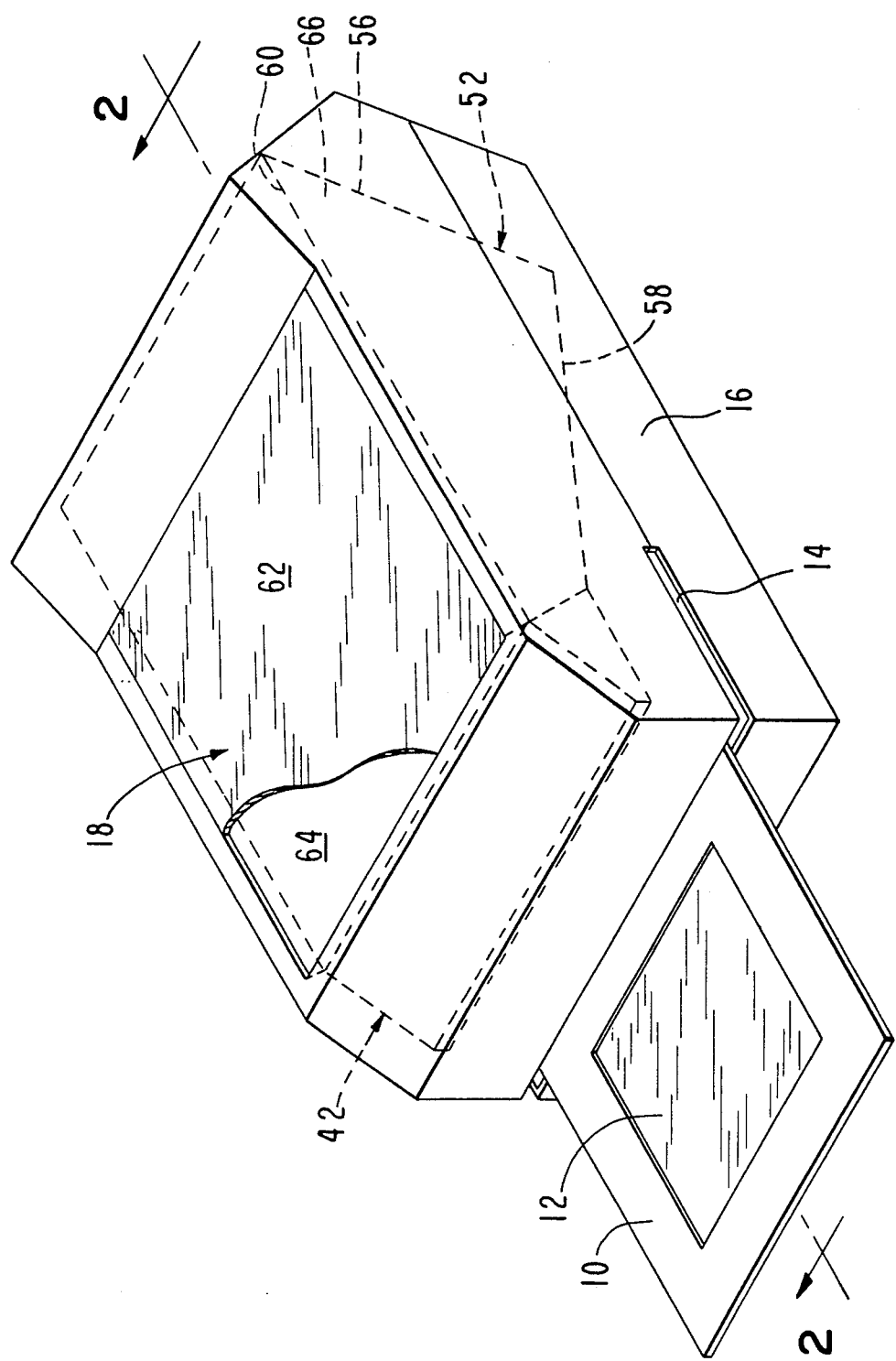
FIG. 1 is a perspective view of the optical projector/reader according to one embodiment of the invention with portions of the viewing screen broken away for illustration.

Referring now more particularly to FIG. 1, the preferred embodiment of the invention is illustrated in which a frame 10 carrying a film transparency 12, such as microfilm, is adapted to be slid into a slot 14 in the housing 16 of the microfilm reader of the invention. The slot 14 is open-ended at the sides of the housing 16 so that rectangularly shaped film holders, or even continuous film webs, may be inserted lengthwise into the slot. The housing 16 has a viewing screen assembly 18 in its top surface thereof and the slot 14 is located in one of the shorter sides of the housing 16.

Figure 2:
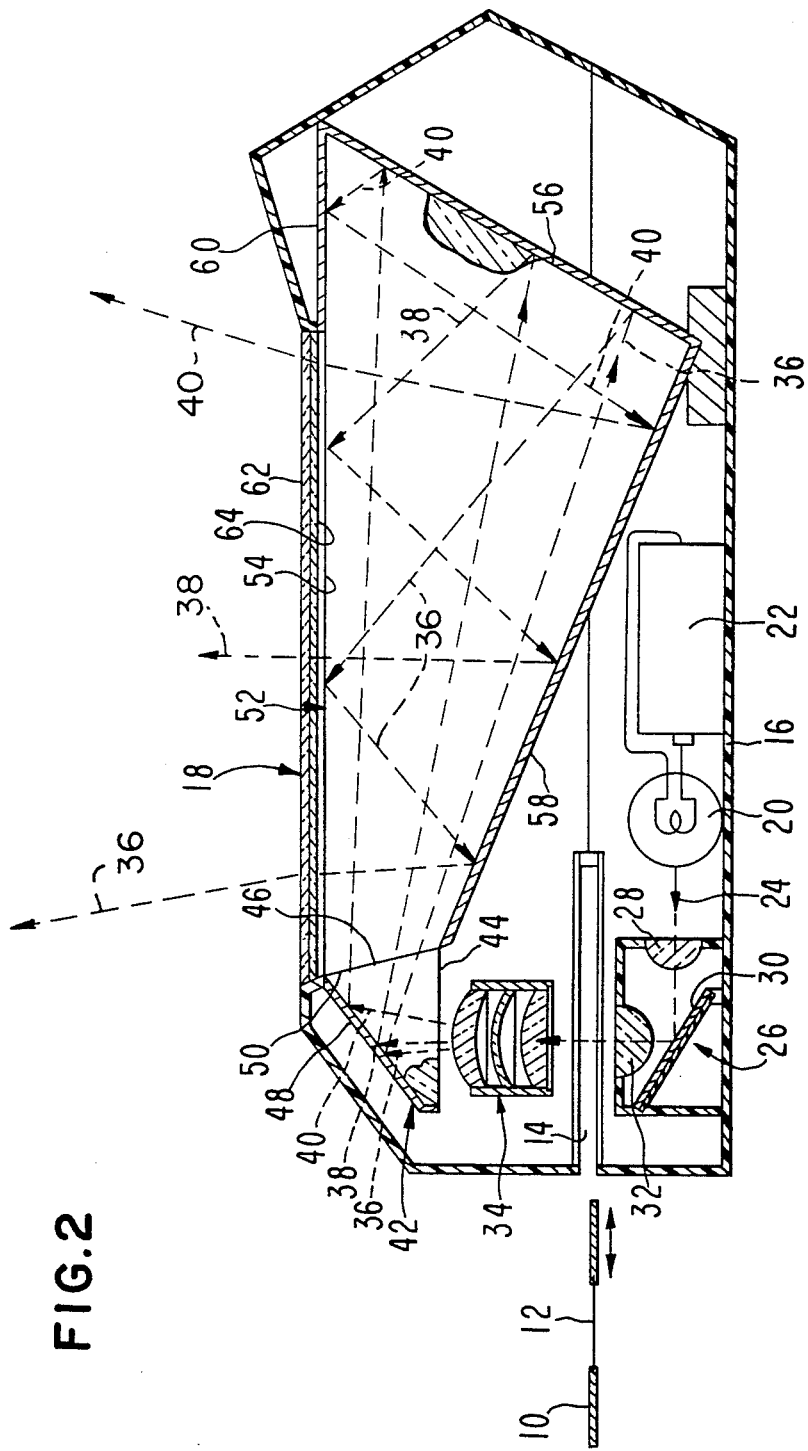
FIG. 2 is a vertical, sectional view taken generally along the lines 2—2 of FIG. 1.

Referring now more particularly to FIG. 2, the interior of the microfilm reader of the invention is illustrated in greater detail. A low power consuming light bulb 20 which is powered either from the main line or by a battery 22 projects a beam of light illustrated by the dashed line and arrows 24 through a condenser lens assembly 26 made up of a first condenser lens 28, an intermediate, 45° angled mirror 30 and a second condenser lens 32. The condenser lens assembly 26 serves to evenly illuminate the transparency 12 when it is placed within the slot 14. The projected image from the transparency 12 passes through a projection lens assembly 34 which will not be described in detail since such projecting lens assemblies are well known in the art. The light beam exiting from the projection lens assembly 34 diverges as illustrated by the left, center and right dashed lines and arrows, as viewed in FIG. 2, which are numbered 36, 38 and 40, respectively. It is to be understood that the light beam represented by these reference arrows is a continuous, diverging light beam and the arrows are only for purposes of illustration.

The diverging light beam exiting from the projection lens assembly 34 enters an optional, reflecting prism 42 having the cross-sectional shape of a triangle, as viewed in FIG. 2. The reflecting prism 42 has an entrant surface 44, opposite to the projection lens assembly 34, which is transparent and an exit surface 46 which is also transparent. The third face of the prism 42 is a mirror coated surface 48 which is aligned at approximately 45° to the optical center axis of the projection lens assembly 34. Since the purpose of the prism 42 is primarily to bend the diverging light beam at a 90° angle, in other embodiments other devices suitable for this purpose may be substituted or the projection optics may be realigned to make the 90° bend unnecessary.

The exit surface of the prism 42 mates with an entrant surface 50 of a prism 52. The entrant surface 50 is substantially flat and is transparent. The prism 52 has a cross-sectional shape in the form of a trapezium, as viewed in FIG. 2, that is, it is a quadrilateral having no sides parallel. The prism may be made of a material such as polymethylmethacrylate which is highly transparent to light and has an optical index of refraction of $n = 1.49$. It is also relatively light in weight compared to some other transparent materials such as glass or quartz. Other highly transparent materials can also be used.

The prism 52, in addition to the entrant surface 50, also has a flat, transparent exit surface 54 which faces the viewing screen assembly 18. The prism further has a first, metal coated reflecting surface 56 which is opposite to the entrant surface 50 and which forms a predetermined, acute angle with the exit surface 54 such that a major portion of the light beam, as represented by the reference arrows 38 and 36, passing through the entrant surface 50, is reflected by the reflecting surface 56 to the exit surface 54 at an incident angle which is greater than the critical angle for total internal reflection by the exit surface.

The prism 52 further has a second, metal coated reflecting surface 58 which angularly faces the exit surface 54 for returning the light beam, as represented by the arrows 36 and 38, which is reflected internally by the exit surface 54. The light returned by the reflecting surface 58 strikes the exit surface 54 at an incident angle which is less than the critical angle for the exit surface 54 so that the returned light beam passes through the exit surface 54 to impinge on the viewing screen assembly 18.

The prism exit surface 54 is co-planar with a third, metal coated reflective surface 60 which is located at the distal end of the prism from the entrant surface 50. The reflecting surface 60 receives a minor portion of the light beam passing through the entrant surface 50, as represented by the directional arrow 40, after the light beam portion 40 is reflected by the upper portion of the reflecting surface 56, as viewed in FIG. 2. The light beam portion 40, reflected by the reflecting surface 60 at an angle less than the critical angle, strikes the reflecting surface 58 and is returned upwardly and out through the exit surface 54.

The viewing screen assembly 18 comprises a light diffusing plate 62 which is parallel to the exit surface 54 and a Fresnel lens 64 which is also in the form of a flat plate and which is parallel to the light diffusing plate 62. The Fresnel lens 64 is located intermediate the light diffusing plate 62 and the exit surface 54. The light diffusing plate 62 also serves as a cover for the Fresnel lens 64. The purpose of the light diffusing plate 62 and the Fresnel lens 64 is to give a brighter and more uniformly illuminated picture, particularly at the edges. The manner in which these two cooperate to produce this result is described more fully in U.S. Pat. No. 3,319,517 and is a phenomena well known in the art. It should be understood, however, that it is the prism-optics of the invention together with the viewing screen assembly which preserve the transmitted viewing light and thereby allow the use of low power consuming light bulbs.

The longitudinal ends of the prism 52 are also provided with reflective, metal coatings 66 (see FIG. 1) to minimize light loss.

By way of example only, the dimensions of the prism illustrated in FIG. 2 will now be described. The length of the prism 52, that is, the depth into the paper as viewed in FIG. 2, is approximately 5 inches, the width of the exit surface 54 is 3 inches, the width of the reflecting surface 56 is 1½ inches, the widths of the reflecting surfaces 56 and 58 are approximately 3 inches and 4⅞ inches, respectively, the acute angle formed at the intersection of the reflecting surfaces 56 and 60 is approximately 65°, the oblique angle formed between the reflecting surfaces 56 and 58 is approximately 90°, and the angle between the exit surface 54 and the reflecting surface 58 is approximately 25°.

While in the above described embodiment a particular cross-sectional shape is given for the prism 52, it should be apparent that in other embodiments this cross-sectional shape may be modified slightly. For example, in one embodiment the lower corner of the prism, as viewed in FIG. 2, is truncated to save space. Moreover, the above recited angles between the prism surfaces 54 and 58 and 54 and 56 may be varied in other combinations within the limits of 20° to 28° and 62° to 68°, respectively, depending upon such parameters as, for example, the distance of the projection optics from the entrant surface, the optical index of refraction of the prism material, and the degree of divergence of the projected beam. Furthermore, as mentioned above, the arrangement of the projection optics with respect to the prism 52 may be modified in other embodiments so that the light beam is projected directly into the prism 52 through the entrant surface 50 rather than being bent by the reflecting prism 42.

One important factor in determining all of these criteria is that the light beam reflected by the reflecting surface 56 strike the exit surface 54 at an angle greater than the critical angle so that total internal reflection is achieved. This feature allows for a greater optical path length without undue light losses than in prior art devices using mirrors and lenses for a given amount of space that the prism occupies because one surface doubles as both a reflecting surface and an exit or "viewing" surface. The device depicted in FIGS. 1 and 2 and described above is capable of magnifying the film transparency 12 by approximately twelve times so that it is readily intelligible to the viewer.

The prism 52, the battery 22, the light bulb 20, and the condenser and projection lens systems 34 and 26 are, of course, fastened in brackets in the housing 16 and these brackets will not be described in detail since their function is well known to those skilled in the art.

As mentioned earlier in this application, the term transparency is to be understood as including any semi-transparent image forming medium, such as a photographic transparency or a specimen slide. The viewing assembly is to be understood as including any attachments to the light diffusing plate 62, such as a camera or a photocopier.

The remaining terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. Optical apparatus for projecting a light beam comprising a prism having a transparent first surface, a flat, transparent second surface, a metal coated, reflecting third surface opposite to the first surface and forming a predetermined, acute angle with the second surface such that the major portion of a light beam passing through the first surface will be reflected by the reflecting, third surface to the second surface at an incident angle greater than the critical angle for total internal reflection by the second surface, and a metal coated, reflecting fourth surface angularly facing the second surface such that said light beam reflected internally by the second surface will directly strike the fourth surface and be reflected by the fourth surface back to the second surface at an incident angle which is less than the critical angle for the second surface.

2. Optical apparatus as recited in claim 1 further comprising a metal coated, reflecting fifth surface of the prism which is co-planar with the prism's second surface and is located adjacent the second and third surfaces of the prism.

3. An optical prism comprising a block of transparent material having a cross-sectional shape of a trapezium, a transparent first surface, a flat, transparent second surface, and third and fourth, metal coated reflecting surfaces, the second and fourth surfaces facing each other, and diverging toward the third surface from a projected angle of intersection of 20° to 28°, and the third surface angularly facing the second surface and forming an acute angle with the second surface within the range of 62° to 68°.

4. An optical prism as recited in claim 3 further comprising a metal coated, reflective, fifth prism surface which is co-planar with the second surface and is located adjacent the second and third surfaces of the prism.

\* \* \* \* \*